May 13, 1924.
R. R. MINTON
GASOLINE TANK
Filed Aug. 13, 1923
1,494,005
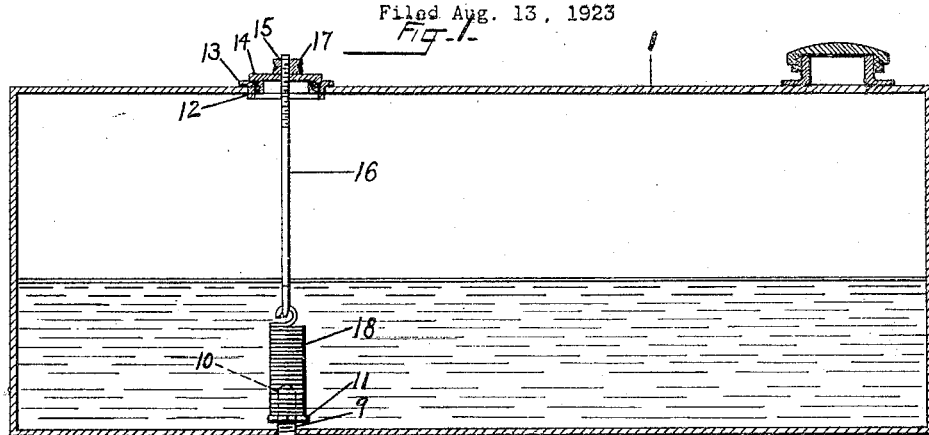
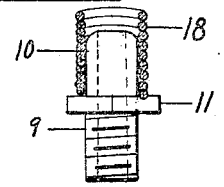
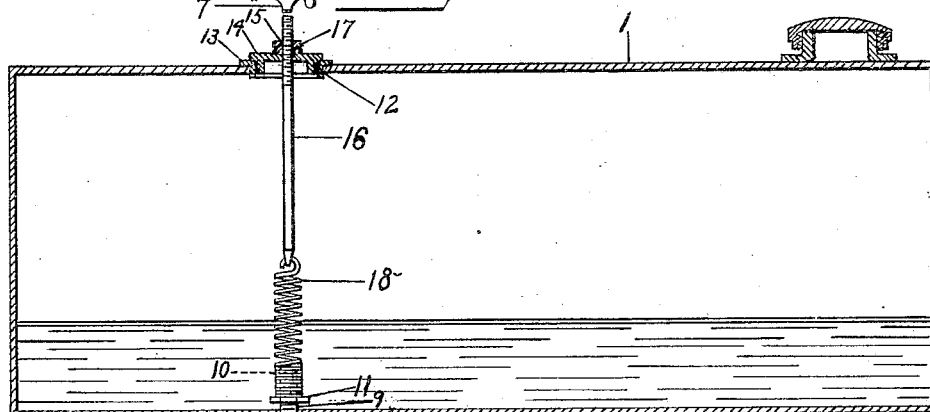
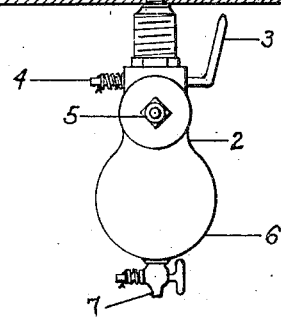
INVENTOR.
Robert R Minton
BY
ATTORNEYS Patented May 13, 1924.

1,494,005

UNITED STATES PATENT OFFICE.

ROBERT R. MINTON, OF DAYTON, OHIO, ASSIGNOR OF ONE-HALF TO CHARLES R. FREESE, OF BROOKVILLE, OHIO.

GASOLINE TANK.

Application filed August 13, 1923. Serial No. 657,262.

*To all whom it may concern:*

Be it known that I, ROBERT R. MINTON, a citizen of the United States, residing at Dayton, in the county of Montgomery and State of Ohio, have invented certain new and useful Improvements in Gasoline Tanks, of which the following is a specification, reference being had therein to the accompanying drawing.

This invention relates to gasoline tanks for use in automobiles.

It consists of a controlling device by which a certain reserve quantity of gasoline will be retained in the tank, after the major portion has been consumed, the consumption of which will cause the automobile to stop, and thus act as a warning as to the remaining quantity; whereupon, by an adjustment of the gauge, the retained quantity is permitted to flow from the tank to the gasoline pipe line which supplies the carburetor, during which period the tank will be refilled.

To these ends, my gauge consists of a tubular column formed of coiled wire, with the coils adapted to lie so closely together as to exclude the passage of gasoline between them, requiring the gasoline to flow through the upper open end of the gauge until such time as by adjustment the coils are slightly separated, to convert the column into an open structure, which is done to permit the outflow of the retained quantity in the tank.

In the accompanying drawings, Figure 1 is a vertical sectional view of a conventional automobile gasoline tank with my controlling device applied thereto in connection with a discharge part, such as usually used on Ford cars;

Figure 2 is a like view showing my controlling device column adjusted with the coils separated; and Figure 3 is a detailed side elevation of the coupling member of my controlling device and a part of the spring column.

1 designates the gasoline tank, of any usual kind used on automobiles. In this tank, the gasoline is stored for use in operating the engine. This tank is connected with the carburetor by any form of pipe line. In Ford cars, a connection between the pipe line and the tank is formed by a discharge column indicated at 2 in these drawings. The handle 3 operates the cut-off plug 4, and the tubular projection 5 connects with the gasoline line to the carburetor. The enlarged lower portion 6 receives any sediment that precipitates from the gasoline when periodically discharged by a pet cock 7. The upper end of the discharge cock 2 is interiorly screw threaded, as shown at 8, to receive the lower end 9 of the coupling member of the controlling device. This end is screwed through the tank wall and down into the upper portion 8, to make a tight joint and a sufficiently strong connection. The coupling member has an upper projection 10, on which the coiled spring, which is to form the gauge column, is firmly fitted and held by solder or otherwise, if required. The portion 11 of the coupling constitutes a nut by which to screw the extension 9 through the tank and into the portion 8 of the discharge cock. This assembling may be done before the top of the tank is secured to the side walls, or may be done through an opening in the top of the tank, as indicated at 12, in which is fitted a bushing 13 screw threaded interiorly to receive a cap 14, which when removed leaves the opening in the bushing through which to insert my controlling device and to enable its extension 9 to be screwed into the upper part 8 of the discharge cock.

An opening 15 in the cap receives the adjusting rod 16 of the controlling device which, at its upper end, is threaded for a nut 17, by which the rod is properly adjusted to allow the wire coils 18 to firmly and closely contact with each other to form a closed column or to be adjusted to stand slightly apart to open the column and permit the outflow of the gasoline through the sides of the column, instead of merely through the upper end, as is the case when the coils are in contact and the quantity of gasoline sufficient to flow out through the upper end of the controlling device.

This adjustment of the rod to separate the coils is done when the gasoline gets so low that it will not any longer flow through the top of the column and thence on through the discharge cock to the gasoline line. When that condition is reached, the occupant of the car is warned that his gasoline supply has been reduced to, say, one gallon or two gallons, or to such quantity as the tank will hold after the level is as low as the top of the controlling device. It is then that the adjusting rod is manipulated and the wall of the gauge opened by separating the coils, so that the gasoline will flow through the sides of the column until practically the entire quantity has passed out, but before that time the user is expected to replenish his supply.

It will now be understood that my controlling device comprises a column formed of resilient wire coiled helically with the coils one upon the other in tight and close contact in the normal state. But that when the gasoline is to be permitted to flow through the sides of the top the coils are slightly separated to form open spaces between them.

I regard myself as the first to invent a gasoline gauge having a column composed of helically wound resilient wire, the coils being adapted normally to closely contact to prevent the passage of gasoline, and to be adjusted to form spaces between them to permit the flow of gasoline.

Having thus fully described my invention, what I claim as new, and desire to secure by Letters Patent, is:

1. A gasoline control device comprising a valve, constantly open at its ends and normally closed throughout its side walls and formed of a helically wound resilient material, and an adjusting rod, and adapted when applied to a gasoline tank to permit the gasoline to flow out when its level is above the upper open end and to normally prevent the discharge when the gasoline level is below such end.

2. A gasoline control device, comprising a helically wound resilient material to form a normally tight column when the coils are in contact and an open column when they are adjusted apart, and having its ends constantly open, a coupling member to which the column is secured and which is adapted for connection with a tank, and an adjusting device to act on the coil.

In testimony whereof, I affix my signature.

ROBERT R. MINTON.